| United States Patent [19] | [11] | 4,434,193 |
|---|---|---|
| Beckenhauer | [45] | Feb. 28, 1984 |

[54] METHOD FOR RETARDING MASONRY EFFLORESCENCE

[76] Inventor: Thomas Beckenhauer, 14439 N. 107th, Longmont, Colo. 80501

[21] Appl. No.: 304,699

[22] Filed: Sep. 22, 1981

[51] Int. Cl.³ .............................. A23B 5/00; A23J 1/08
[52] U.S. Cl. ........................................ 427/299; 106/2; 427/309
[58] Field of Search ...................... 427/384, 393.6, 136, 427/299, 134; 106/2, 13, 12; 252/70

[56] References Cited

U.S. PATENT DOCUMENTS 3,624,243  2/1970  Scott ..................................... 106/13
3,928,654  12/1975  Bonnanzio ........................... 427/136
4,163,079  7/1979  Beafore ................................. 106/13

OTHER PUBLICATIONS

Chemical Abstracts 63: 7192b, 1965, Pedretti.
"Control and Removal of Efflorescence" Info. Series No. 4, 1977, NCMA-TEK, National Concrete Masonry Ass.
Chem. Abst. 90: 205,990c, Suzuki.

*Primary Examiner*—Theodore Morris
*Attorney, Agent, or Firm*—Ralph F. Crandell

[57] ABSTRACT

A method for retarding the efflorescence of masonry comprises applying to the masonry a coating consisting of a glycol such as polyethylene glycol in an acidic solution, having a pH of about 5.5, the solution being applied at the rate of about 100 sq. ft. per gallon.

9 Claims, No Drawings

METHOD FOR RETARDING MASONRY EFFLORESCENCE

BACKGROUND

1. Field of the Invention

The present invention relates to a method for retarding efflorescence on masonry surfaces.

Certain salts or hydrates in masonry compositions, upon drying or exposure to the air, loose water of crystalization and crumble to a white anhydrous powder. This loss of water on the part of the hydrate to the atmosphere is called efflorescence. When it occurs on masonry surfaces, an unsightly surface appearance results. When it occurs beneath the surface, spalling or facturing can result from the growth of the salts.

2. Description of the Prior Art

The causes, effects and treatment of efflorescence are discussed at length in the July, 1960, December, 1969, January, 1970, and September/October 1976 issues of "Technical Notes on Brick Construction" published by the Brick Institute of America, 1750 Old Meadow Road, McLean, Virginia, 22101, and in an article entitled "Control and Removal of Efflorescence" Information Series No. 4, 1977, NCMA-TEK, National Concrete Masonry Association, McLean, Virginia, 22101, which notes and article are incorporated herein by this reference and made a part hereof.

OBJECTS OF THE INVENTION

The principal object of the invention is to provide an improved method for retarding the efflorescence of masonry.

SUMMARY OF THE INVENTION

In accordance with the present invention, the improved composition for retarding efflorescence of masonry comprises a glycol, such as polyethylene glycol, having a molecular weight of between about 200 and about 1000, ethylene glycol or propylene glycol, in an acidic solution having a pH of between about 5 and about 6. The composition is applied to the masonry at the rate of about 1 gallon per 100 sq. ft. Prior to application of the composition, the masonry is cleaned and washed thoroughly. The composition may be applied while the masonry is damp, but not soaked.

DESCRIPTION OF THE PREFERRED EMBODIMENT

The present invention involves a composition and method for retarding efflorescence on masonry surfaces. Essentially, this invention comprises coating the masonry surface with an acidic glycol solution. The surface is cleaned of any existing efflorescence and washed thoroughly, and allowed to dry to a damp but not soaked condition. An acidic glycol solution is then applied to the surface, covering the surface at the rate of approximately 100 sq. ft. of masonry surface per gallon of glycol solution.

The glycol may be polyethylene glycol, having an average molecular weight of between about 200 and about 1000, ethylene glycol, propylene glycol, triethylene glycol, diethylene glycol, tetraethylene glycol and related materials. For a technical discussion and disclosure of glycols, reference is made to "Organic Chemicals/The Glycols", The Dow Chemical Company, Midland, Michigan, 1956, 1961 and 1974, Form No. 117-976-79, which publication is incorporated herein by this reference and made a part hereof. The glycol is buffered to an acidic state with a pH of approximately 5.5 by the addition of a weak halogen acid such as hydrochloric acid, or a mixture of glacial acetic acid and ammonium hydroxide. The volume ratio of glycol to buffer agent is approximately 9 to 1.

An illustrative preferred glycol composition comprises 450 parts by volume of polyethylene glycol, having an average molecular weight of about 200, mixed with 30 parts by volume glacial acetic acid and 20 parts by volume aqueous 29% ammonium hydroxide, 26° Bé. Similar compositions can be made utilizing propylene glycol or one of the other above-mentioned glycols. For the higher molecular weight glycols, it may be appropriate to add water. For example, another glycol solution embodying the invention comprises 450 parts by volume polyethylene glycol having an average molecular weight of 1000, 400 parts by volume water, 300 parts by volume glacial acetic acid and 20 parts by volume aqueous 29% ammonium hydroxide.

Still another composition finding utility in connection with the present invention involves eight parts by volume polyethylene glycol having an average molecular weight of 600 and two parts by volume of a commercial hydrochloric acid.

Some other acidic buffering agents can be utilized. The principal objective is to maintain the glycol solution as slightly acidic, generally with a pH of between 5 and 6.

In order to demonstrate the efficacy of the present invention as compared to conventional silicone treatment, a sample of a proprietary compound was submitted by Thomas Beckenhauer to the Protex laboratory for evaluation as a material capable of reducing or eliminating efflorescence. The material was clear aqueous solution. A sample of the present glycol solution was applied to face brick and compared to a 5% silicone in solvent solution, likewise applied to face brick. For this purpose, twelve standard face bricks were used as the substrate. Eight of the bricks were coated on the end and one half the sides with both the above described, illustrative, preferred glycol formulation and the silicone solution. After 24 hours storage in laboratory air, two of each of the specimen bricks were placed on end, untreated side down, in a 5% solution of sodium sulfate one half inch deep. Two of each of the specimen bricks were placed in one half inch of saturated lime (Ca-(OH)$_2$) solution. Two untreated bricks were also placed in each solution.

After four weeks of immersion in one half inch of sodium sulfate solution, the control bricks exhibited surface efflorescence on their entire exposed area, crystals one fourth inch thick had developed. The treated bricks exhibited no efflorescence. On breaking the bricks treated with the glycol formulation of the present invention, no internal crystal growth was observed. On breaking the silicone treated bricks, crystals could be observed at the interface of the limit of penetration of the silicone. No efflorescence was observed on any of the specimens immersed in the saturated lime water.

While certain illustrative compositions and embodiments of the present invention are described above, it should be understood that there is no intention to limit the invention to the specific forms thereof disclosed. On the contrary, the intention is to cover all modifications, alternatives, equivalents and uses falling within the spirit and scope of the invention as expressed in the appended claims.

What I claim is:

1. The method of retarding the efflorescence of masonry structures comprising cleaning and washing the masonry to remove existing efflorescence deposits, allowing the masonry structure to dry to at most a damp condition, and thereafter applying to the masonry a coating of an acidic glycol solution at the rate of about one gallon per one hundred square feet to penetrate the masonry and thereby retard efflorescence thereof.

2. The method of claim 2 wherein said acidic glycol solution has a pH of about 5.5.

3. The method as defined in claim 2 wherein said glycol solution is an acidic aqueous glycol solution.

4. The method as defined in claim 2 wherein said solution consists essentially of about 9 parts by volume glycol to about 1 part by volume acidic buffering agent.

5. The method as defined in claim 2 wherein said solution consists essentially of about 450 parts by volume glycol, 300 parts by volume glacial acetic acid and 20 parts by volume 29% aqueous ammonium hydroxide.

6. The method as defined in claim 2 wherein said glycol is polyethylene glycol having a molecular weight from about 200 to about 1000.

7. The method as defined in claim 2 wherein said glycol is propolyene glycol.

8. The method as defined in claim 2 wherein said glycol is ethylene glycol.

9. The method as defined in claim 2 wherein said solution comprises eight parts by volume polyethylene glycol having an average molecular weight of about 600 and two parts by volume hydrochloric acid.

* * * * *